United States Patent
Sun et al.

(10) Patent No.: US 8,023,527 B2
(45) Date of Patent: Sep. 20, 2011

(54) METHOD AND APPARATUS FOR ADJUSTING TIMESLOT FRAGMENTS OF MULTIPLE LINKS

(75) Inventors: Junbai Sun, Shenzhen (CN); Huadong Li, Shenzhen (CN); Jianguo Zeng, Shenzhen (CN); Yanming Xiao, Shenzhen (CN); Hao Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 120 days.

(21) Appl. No.: 12/138,966

(22) Filed: Jun. 13, 2008

(65) Prior Publication Data

US 2008/0247754 A1    Oct. 9, 2008

Related U.S. Application Data

(63) Continuation of application No. PCT/CN2007/070594, filed on Aug. 30, 2007.

(30) Foreign Application Priority Data

Sep. 13, 2006 (CN) .......................... 2006 1 0127308

(51) Int. Cl.
- *H04L 12/43* (2006.01)
- *H04L 12/28* (2006.01)
- *H04J 3/16* (2006.01)
- *H04J 3/22* (2006.01)
- *H04J 14/00* (2006.01)

(52) U.S. Cl. .......... 370/458; 370/254; 370/468; 398/43; 398/52

(58) Field of Classification Search .................. 370/458, 370/254, 255, 468; 398/52, 43
See application file for complete search history.

(56) References Cited

U.S. PATENT DOCUMENTS

| | | | |
|---|---|---|---|
| 6,205,154 B1 | 3/2001 | Schmidt et al. | |
| 7,016,357 B1 | 3/2006 | Wellbaum et al. | |
| 7,154,900 B1* | 12/2006 | Alanqar et al. | 370/401 |
| 7,317,728 B2* | 1/2008 | Acharya et al. | 370/395.51 |
| 7,580,401 B2* | 8/2009 | Shew et al. | 370/351 |
| 2003/0123472 A1* | 7/2003 | Dufour et al. | 370/442 |
| 2003/0214962 A1* | 11/2003 | Allaye-Chan et al. | 370/406 |
| 2003/0224763 A1* | 12/2003 | Kuramatsu | 455/412.2 |
| 2004/0165540 A1* | 8/2004 | Acharya et al. | 370/252 |
| 2004/0186701 A1* | 9/2004 | Aubin et al. | 703/13 |

(Continued)

FOREIGN PATENT DOCUMENTS

CN    1206525    1/1999

OTHER PUBLICATIONS

Acharya, et al., 2004. "MobiPack: Optimal Hitless SONET Defragmentation in Near-Optimal Cost". INFOCOM 2004, IEEE: 1819-1829.

(Continued)

*Primary Examiner* — Ayaz R Sheikh
*Assistant Examiner* — Tarell Hampton
(74) *Attorney, Agent, or Firm* — Slater & Matsil, L.L.P.

(57) ABSTRACT

A method and apparatus for adjusting timeslot fragments of multiple links in an Automatically Switched Optical Network (ASON). The method includes the steps of: obtaining link information of multiple links necessary for timeslot fragment adjustment, calculating adjusted link information of each link according to the link information, and adjusting a timeslot allocation of each link according to the adjusted link information.

15 Claims, 8 Drawing Sheets

U.S. PATENT DOCUMENTS

| | | | | |
|---|---|---|---|---|
| 2005/0160171 | A1* | 7/2005 | Rabie et al. | 709/227 |
| 2005/0195835 | A1* | 9/2005 | Savage et al. | 370/401 |
| 2006/0126521 | A1* | 6/2006 | Hyndman et al. | 370/248 |
| 2006/0165122 | A1* | 7/2006 | Gupta et al. | 370/468 |
| 2006/0256727 | A1* | 11/2006 | Acharya et al. | 370/244 |
| 2007/0091913 | A1* | 4/2007 | He et al. | 370/458 |
| 2007/0098008 | A1* | 5/2007 | Sun et al. | 370/444 |

OTHER PUBLICATIONS

International Search Report, International Application No. PCT/CN2007/070594, Date of mailing: Dec. 13, 2007, 4 pages.

Written Opinion of the International Searching Authority, International Application No. PCT/CN2007/070594, Date of mailing: Dec. 13, 2007, 11 pages.

European Office Action, European Application No. 07 785 478.4-1237, Applicant: Huawei Technologies Co., Ltd., Dated: Jul. 9, 2009, 5 pages.

European Office Action, European Application No. 07 785 478.4-1237, Applicant: Huawei Technologies Co., Ltd., Dated: Jan. 11, 2011, 4 pages.

* cited by examiner

METHOD AND APPARATUS FOR ADJUSTING TIMESLOT FRAGMENTS OF MULTIPLE LINKS

CROSS-REFERENCE TO RELATED APPLICATIONS

This application is a continuation of International Patent Application No. PCT/CN2007/070594, filed on Aug. 30, 2007, and which designates the United States and claims priority from Chinese Patent Application No. 200610127308.8, filed on Sep. 13, 2006, each of which is incorporated by reference in its entirety herein.

FIELD OF THE INVENTION

The present invention relates to technologies of adjusting timeslot fragments in a network, and more particularly, to a method for adjusting timeslot fragments of multiple links.

The present invention further relates to an apparatus for adjusting timeslot fragments of multiple links.

BACKGROUND OF THE INVENTION

The Automatically Switched Optical Network (ASON) has a function of automatic discovery of network control topology and resource topology, and the function of automatic establishment, rerouting recovery or soft rerouting when in failure can therefore be implemented for Label Switched Path (LSP) of Switched Connection (SC) or Soft Permanent Connection (SPC).

If multiple instances of SC or SPC adding/deleting, rerouting or soft rerouting adjustments are performed for the ASON networking, there will be timeslot fragments on some links, which may affect the establishment of concatenated bandwidth SC or SPC. As shown in FIG. 1, there are eight timeslots between network element A and network element B in total. When created, LSP1, LSP2, LSP3, LSP 4 and LSP 5 all go through one link between network element A and network element B, and occupy timeslot 1, timeslot 2, timeslot 3 and timeslot 4, timeslot 5 and timeslot 6, respectively.

If LSP2 and LSP4 are deleted, rerouted or adjusted to other links by manual soft rerouting, timeslot 2 and timeslot 5 change to idle state as shown in FIG. 2. Then the link has four idle timeslot bandwidths including timeslot 2, timeslot 5, timeslot 7 and timeslot 8. However, there is a cavity between timeslot 2 and timeslot 5 as well as between timeslot 5 and timeslot 8, and a timeslot label of four consecutive timeslot bandwidths can not be allocated. As a result, the link resource is not available for the establishment, rerouting or soft rerouting of an LSP occupying four timeslot bandwidths. Likewise, if timeslot 7 and timeslot 8 are occupied, the link resource is not available for the establishment, rerouting or soft rerouting of an LSP occupying two timeslot bandwidths either even though there are still idle timeslots, timeslot 2 and timeslot 5.

To solve the above problem, a conventional method of adjusting timeslot fragments is described below. The timeslot fragment rate can be calculated for a link by a timeslot fragment calculator using an algorithm (e.g. a Mobipack defragmentation algorithm as described for example in S. Acharya, et al., MobiPack: Optimal Hitless SONET Defragmentation in Near-Optimal Cost, INFOCOM 2004, IEEE, Jul. 11, 2004, pp. 1819-1829, which is hereby incorporated by reference in its entirety herein), taking into account minimal moving times, the fragment granularity that can be contained and whether timeslots are unable to be randomly moved because of a certain particularity. A timeslot selector finds an optimal candidate timeslot capable of reducing the timeslot fragment rate of an optical interface. A circuit connection adjustor adjusts a service connection occupying a certain timeslot to the optimal candidate timeslot in a bridge-like manner; and during the adjustment, the service connection may suffer from transient disruption (several milliseconds generally). For example, LSP5 can be adjusted from timeslot 6 to timeslot 2 as shown in FIG. 2, and the timeslots after adjusted are shown in FIG. 3.

During the implementation of the present invention, the inventors discovered the following problems in the above conventional method.

The conventional method only takes the timeslot fragment adjustment for a single link into account. If the timeslot fragment adjustment is performed for multiple links, or for all links of a network, the timeslot fragment adjustment will be performed for each link respectively. Therefore, the service connection going through multiple links may repeatedly suffer from multiple occurrences of transient disruption. In addition, during the timeslot fragment adjustment for these links, their resource usage and the maintenance of a service connection going through the links would be inevitably affected. If the conventional method of adjusting timeslot fragments is applied to the adjustments shown in FIG. 5, when the timeslot fragment adjustment is performed on the links respectively between network element A and network element B, between network element B and network element C as well as between network element C and network element D, LSP5 is adjusted from timeslot 6 to timeslot 2 on the link between network element A and network element B, from timeslot 3 to timeslot 2 on the link between network element B and network element C, and from timeslot 7 to timeslot 2 on the link between network element C and network element D. During each adjustment, LSP5 will suffer from transient disruption once, and three times in total. When the timeslot fragment adjustment is performed on the links between network element B and network element C as well as between network element C and network element D, LSP3 is adjusted from timeslot 5 to timeslot 3, and suffers from transient disruption twice. In general, the more the links are, the more occurrences of transient disruption the LSP suffers from during the adjustment, and the more the service carried by the LSP is affected.

SUMMARY OF THE INVENTION

Embodiments of the present invention provide a method for adjusting a timeslot fragment of multiple links based on a service connection, which can reduce the effects of the dip of the service connection during a large-scale timeslot fragment adjustment for multiple links. Embodiments of the present invention further provide an apparatus for adjusting timeslot fragments of multiple links.

An inventive method for adjusting timeslot fragments of multiple links includes the steps of:

obtaining link information of multiple links necessary for timeslot fragment adjustment;

calculating adjusted link information of each link necessary for the timeslot fragment adjustment according to the link information; and adjusting a timeslot allocation of each link according to the adjusted link information.

Preferably, the step of adjusting a timeslot allocation of each link according to the adjusted link information further includes the steps of:

establishing a new path for a pending adjustment service according to the adjusted link information, the pending adjustment service being a service of which the timeslot fragment adjustment is independent of the timeslot fragment adjustment of other services;

switching the pending adjustment service to the new path; and removing an original path of the pending adjustment service.

An inventive apparatus for adjusting timeslot fragments of multiple links includes:

a table establishment module, operable for obtaining link information of multiple links necessary for timeslot fragment adjustment, and calculating adjusted link information of each link necessary for the timeslot fragment adjustment according to the link information; and an adjustment module, operable for adjusting a timeslot allocation of each link according to the adjusted link information.

Because the method for adjusting a timeslot fragment of multiple links in accordance with embodiments of the present invention takes multiple links into account during the adjustment, timeslots on all the links of each LSP to be adjusted can be adjusted at the same time, so that there is only one dip during the adjustment. This greatly reduces the effects caused by the timeslot fragment adjustment for services. At the same time, in the ASON network, the time for single service connection and for the whole network can be reduced greatly during the timeslot fragment adjustment of links.

BRIEF DESCRIPTION OF THE DRAWINGS

Embodiments of the present invention will be further described hereinafter with reference to accompanying drawings.

DETAILED DESCRIPTION OF THE INVENTION

Figure 1:
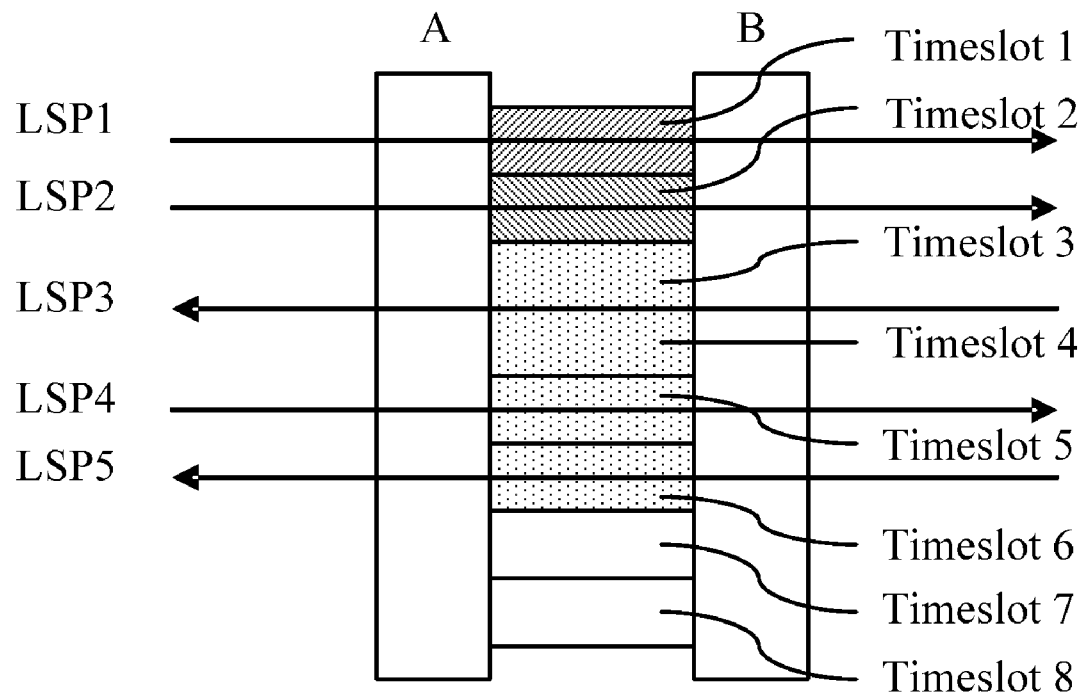
FIG. 1 is a schematic diagram illustrating a structure of a single link carrying LSP services in the prior art.
Figure 2:
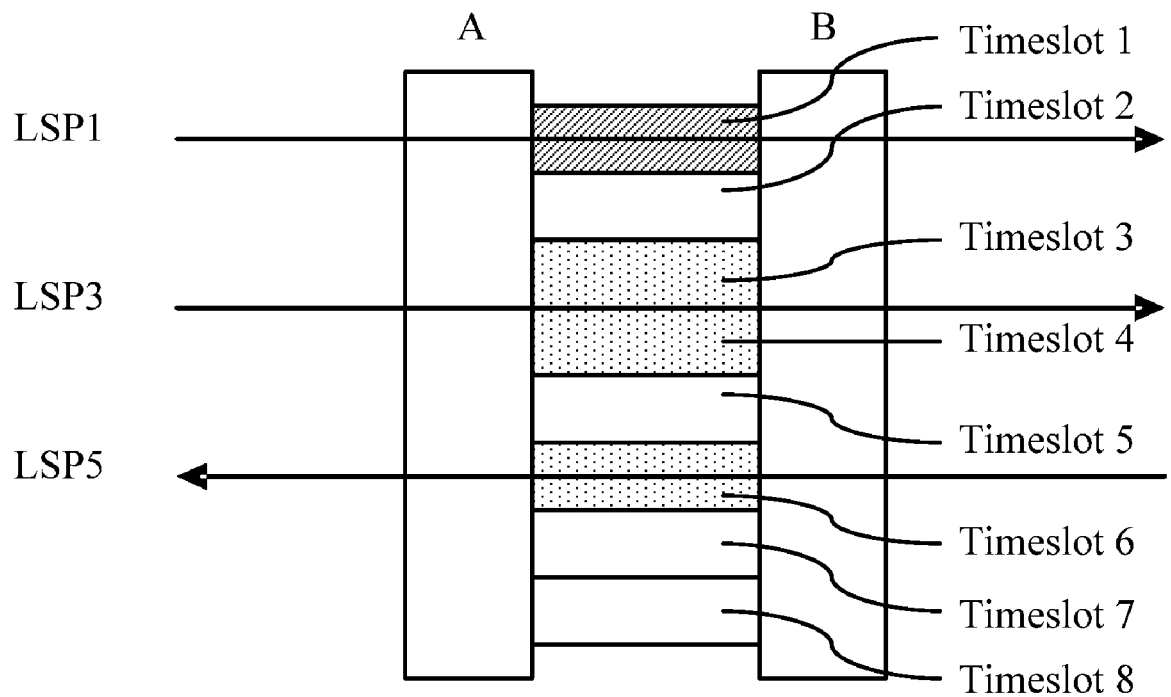
FIG. 2 is a schematic diagram illustrating a structure of the single link carrying LSP services shown in FIG. 1 after two LSPs are removed in the prior art.
Figure 3:
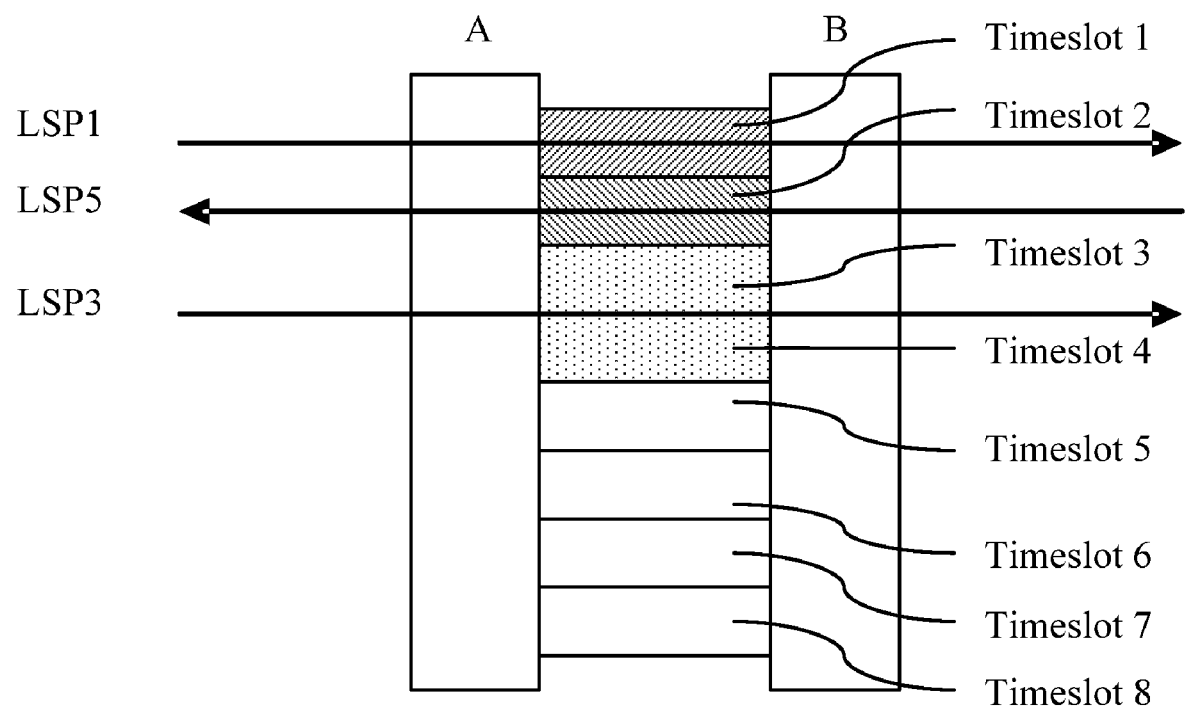
FIG. 3 is a schematic diagram illustrating a structure of the single link carrying LSP services shown in FIG. 2 after the adjustment is performed in the prior art.
Figure 4:
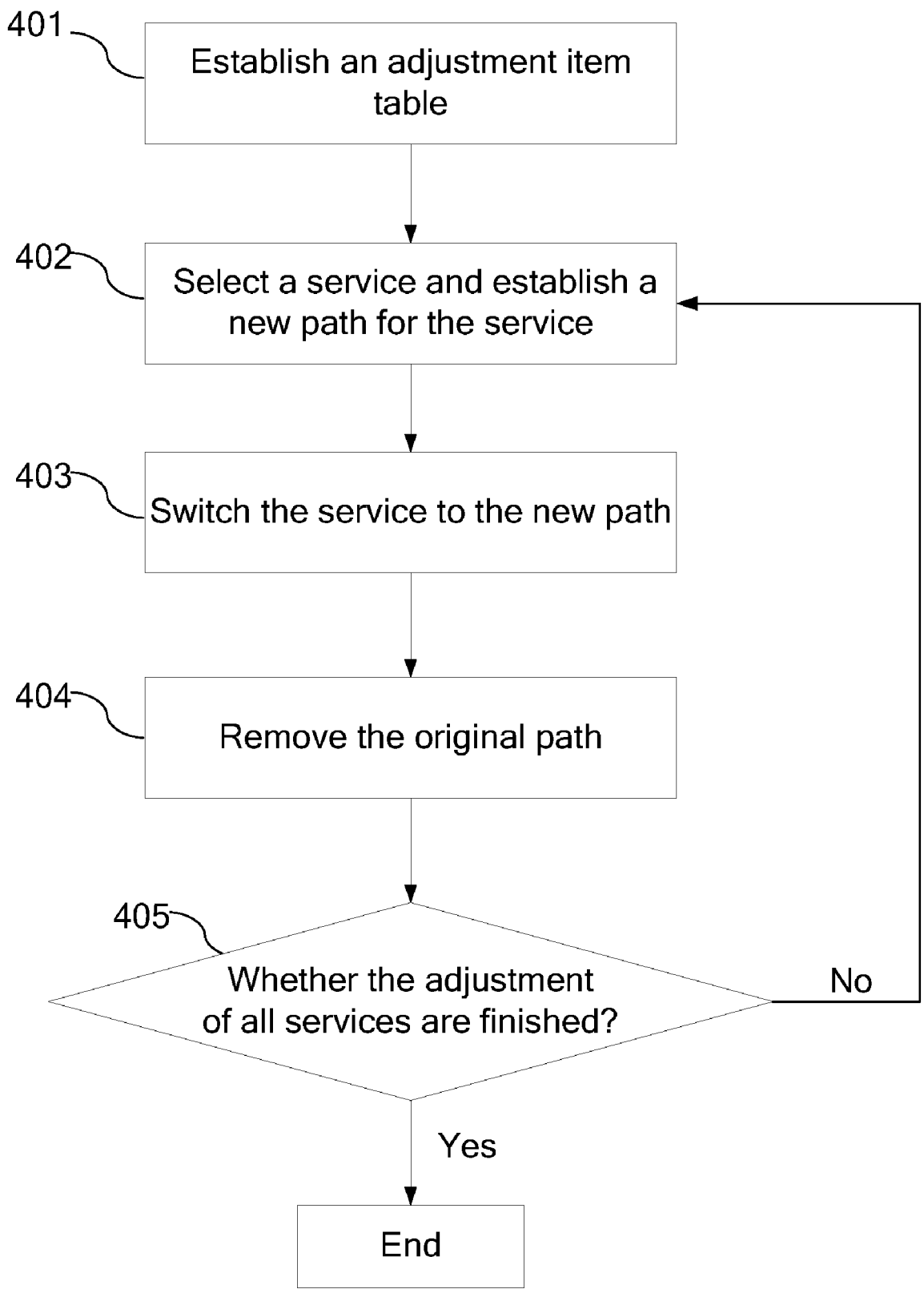
FIG. 4 is a flowchart illustrating a method for adjusting timeslot fragments of multiple links in accordance with an embodiment of the present invention.

As shown in FIG. 4, a method for adjusting timeslot fragments of multiple links in accordance with an embodiment of the present invention is described below.

Block 401: Establish an adjustment item table.

Specifically, all links necessary for timeslot fragment adjustment within the same management domain of the Automatically Switched Optical Network (ASON) are collected, an adjusted timeslot allocation is calculated, and an adjustment item table is established according to a pending adjustment timeslot allocation and the adjusted timeslot allocation.

Block 402: Select a service and establish a new path for the service.

More specifically, one service is selected from pending adjustment services, and a new path is established for the selected service according to the adjustment item table, where the selected service must be a pending adjustment service independent of other services.

Block 403: Switch the service to the new path.

In this embodiment, the pending adjustment service is switched to the new path established.

Block 404: Remove the original path of the selected service.

Block 405: Determine whether all pending adjustment services have been adjusted. If no, return to Block 402. If yes, the adjustment is completed.

Embodiments of the present invention are further described in detail with reference to an example that the timeslot fragment adjustment is performed for the LSP service carried by the multiple links shown in FIG. 5.

Figure 5:
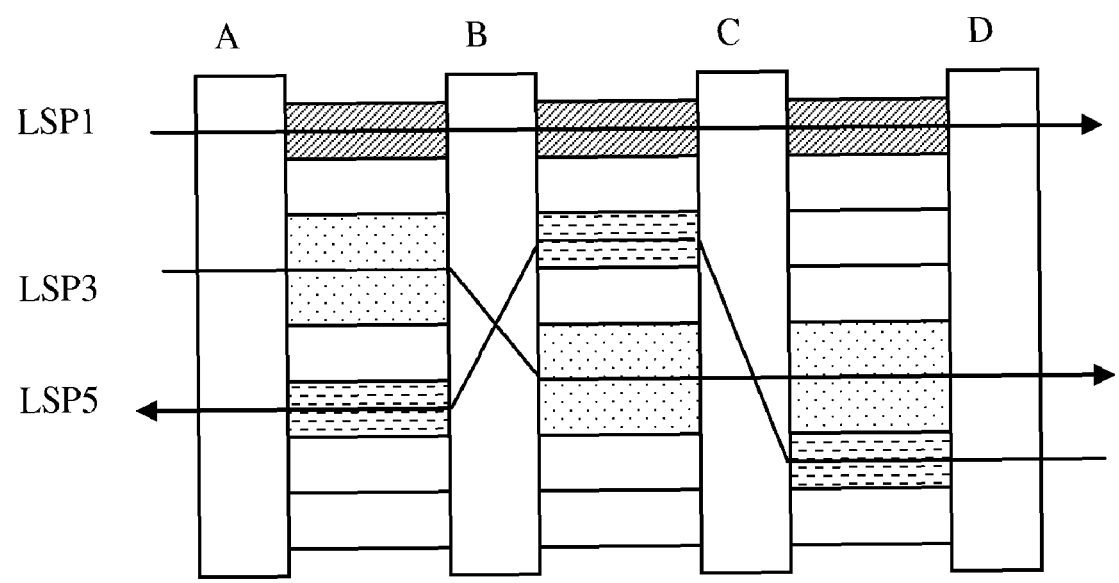
FIG. 5 is a schematic diagram illustrating a structure of multiple pending adjustment links carrying LSP services in accordance with an embodiment of the present invention.

Among the multiple links shown in FIG. 5, for the link between network element A and network element B, LSP1 occupies timeslot 1, LSP3 occupies timeslot 3 and timeslot 4, LSP5 occupies timeslot 6. For the link between network element B and network element C, LSP1 occupies timeslot 1, LSP3 occupies timeslot 5 and timeslot 6, LSP5 occupies timeslot 3, and for the link between network element C and network element D, LSP1 occupies timeslot 1, LSP3 occupies timeslot 5 and timeslot 6, LSP5 occupies timeslot 7. There are timeslot fragments between network element A and network element B, timeslot fragments between network element B and network element C, as well as timeslot fragments between network element C and network element D.

Figure 6:
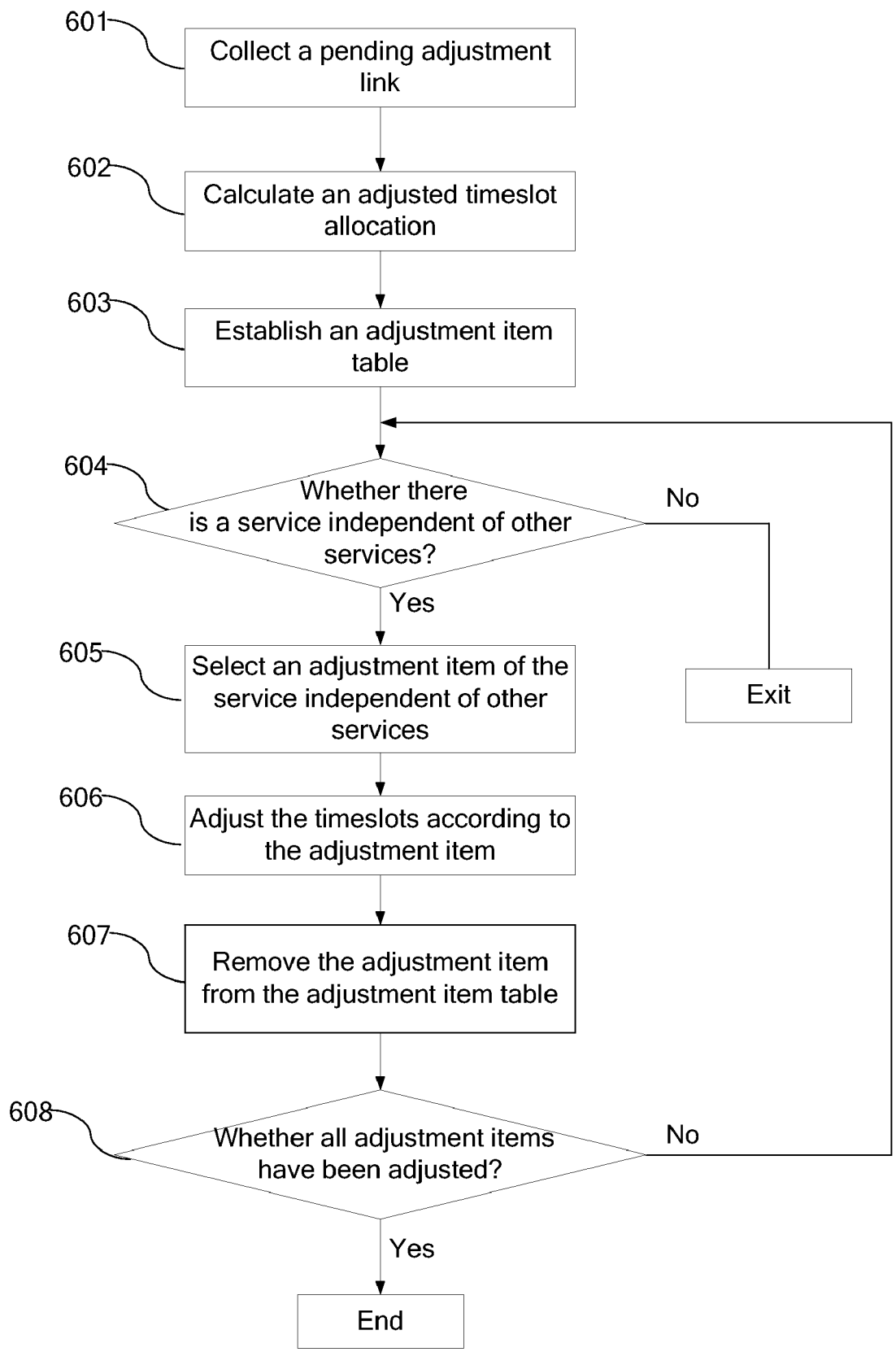
FIG. 6 is a flowchart illustrating a method for adjusting timeslot fragments of multiple links shown in FIG. 5.

Referring to FIG. 6, the method for adjusting timeslot fragments of multiple links shown in FIG. 5 includes the following blocks.

Block 601: Collect a pending adjustment link.

All links necessary for timeslot fragment adjustment within a management domain of the Automatically Switched Optical Network (ASON) are collected, and three links of A-B, B-C and C-D are obtained. On the link of A-B, timeslots 3, 4 and 6 need to be adjusted. On the link of B-C, timeslots 3, 5 and 6 need to be adjusted. On the link of C-D, timeslots 5, 6 and 7 need to be adjusted.

Block 602: Calculate an adjusted timeslot allocation.

Figure 7:
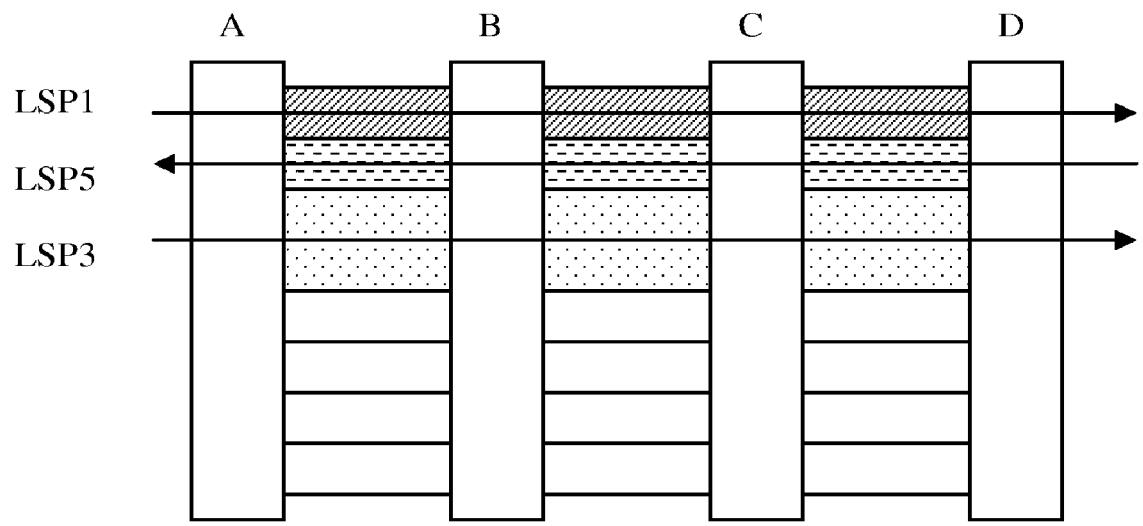
FIG. 7 is a schematic diagram illustrating a structure of the multiple adjusted links carrying LSP services shown in FIG. 5.

An adjusted timeslot allocation is calculated and a timeslot allocation diagram is obtained as shown in FIG. 7.

In FIG. 7, LSP5 is adjusted from timeslot 6 to timeslot 2 on the link of A-B, from timeslot 3 to timeslot 2 on the link of B-C, and from timeslot 7 to timeslot 2 on the link of C-D. LSP3 is not adjusted on the link of A-B, but is adjusted from timeslots 5 and 6 to timeslots 3 and 4 on the link of B-C, and also from timeslots 5 and 6 to timeslots 3 and 4 on the link of C-D. As can be seen from FIG. 7, there is no timeslot fragment any more after adjustment, which provides spaces for the link to carry other services.

Block 603: Establish an adjustment item table.

An adjustment item table is established for each link according to the timeslot allocation in Block 601 (i.e. the timeslot allocation shown in FIG. 5) and the adjusted timeslot allocation in Block 602. The adjustment item table of the link of A-B is shown in the table below:

| Service connection ID | Timeslot number before adjustment | Timeslot number after adjustment | Bandwidth | Dependent relation |
|---|---|---|---|---|
| LSP5 | Slot6 | Slot2 | 1 | 0 |

The adjustment item table of the link of B-C is shown in the table below:

| Service connection ID | Timeslot number before adjustment | Timeslot number after adjustment | Bandwidth | Dependent relation |
|---|---|---|---|---|
| LSP3 | Slot5 Slot6 | Slot3 Slot4 | 2 | LSP5 |
| LSP5 | Slot3 | Slot2 | 1 | 0 |

The adjustment item table of the link of C-D is shown in the table below:

| Service connection ID | Timeslot number before adjustment | Timeslot number after adjustment | Bandwidth | Dependent relation |
|---|---|---|---|---|
| LSP3 | Slot5 Slot6 | Slot3 Slot4 | 2 | 0 |
| LSP5 | Slot7 | Slot2 | 1 | 0 |

In the above tables, "Slot" means "timeslot", a "Dependent relation" of 0 in a table indicates that an LSP is independent of the timeslot adjustment of other LSPs. If an LSP exists in the dependent relation of a second LSP, it indicates that the second LSP with the dependent relation to the LSP can be adjusted only after the LSP is adjusted.

Block 604: Determine whether there is a service independent of other services.

More specifically, it is determined whether there is an adjustment item of the pending adjustment service independent of other services in the adjustment item table. If yes, proceed to Block 605; otherwise, terminate the adjustment.

As can be seen from the adjustment item tables established in Block 603, LSP5 is independent of other services, and Block 605 is therefore performed in this embodiment.

Block 605: Select an adjustment item of the service independent of other services.

In this embodiment, adjustment items of LSP5 are selected from the adjustment item tables respectively. LSP5 should be adjusted from timeslot 6 to timeslot 2 on the link of A-B, from timeslot 3 to timeslot 2 on the link of B-C, and from timeslot 7 to timeslot 2 on the link of C-D.

Block 606: Adjust the timeslots according to the adjustment item.

Figure 8:
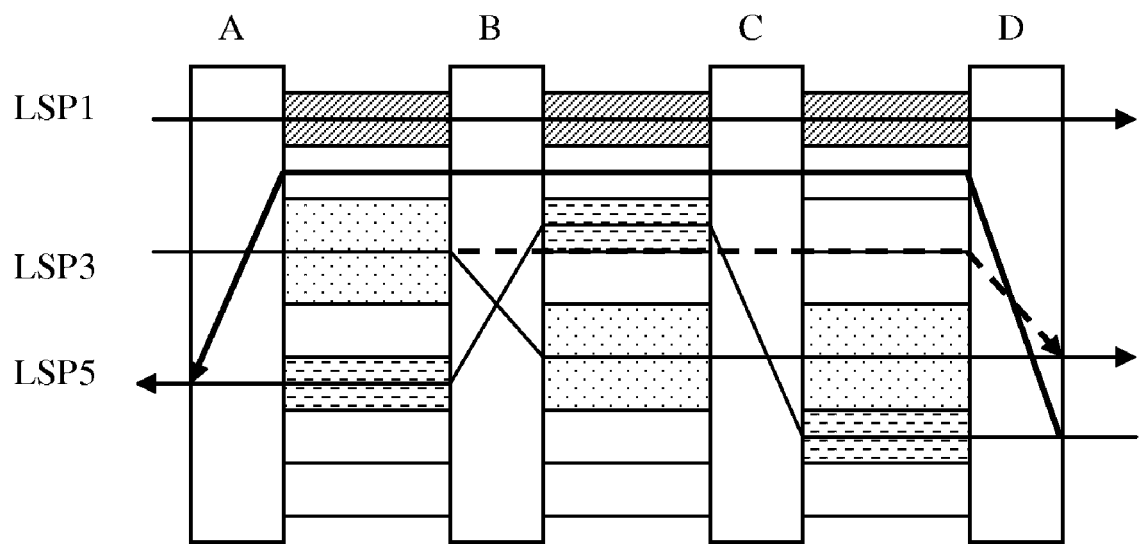
FIG. 8 is a schematic diagram of a middle state for adjusting timeslot fragments of multiple links in accordance with an embodiment of the present invention.

A new path is established using timeslot 2 of the links of A-B, B-C and C-D respectively according to the adjustment items selected in Block 605. Services of LSP5 are switched to the new path, which is shown as the bold real line in FIG. 8, by a soft rerouting manner in which a strict timeslot explicit route with corresponding timeslot granularity is designated and the resources of the links that need not be adjusted are shared. The original path is removed and timeslot 6 of the link of A-B, timeslot 3 of the link of B-C and timeslot 7 of the link of C-D are released.

Block 607: Remove the adjustment item from the adjustment item table.

Items for LSP5 are removed from each adjustment item table. Because there is only the item of LSP5 in the adjustment item table of the link of A-B and the adjustment item table is null after the item of LSP5 is removed, the adjustment item table of the link of A-B is deleted. After the above removing, the adjustment item table of the link of B-C is as follows:

| Service connection ID | Timeslot number before adjustment | Timeslot number after adjustment | Bandwidth | Dependent relation |
|---|---|---|---|---|
| LSP3 | Slot5 Slot6 | Slot3 Slot4 | 2 | 0 |

The adjustment item table of the link of C-D is:

| Service connection ID | Timeslot number before adjustment | Timeslot number after adjustment | Bandwidth | Dependent relation |
|---|---|---|---|---|
| LSP3 | Slot5 Slot6 | Slot3 Slot4 | 2 | 0 |

LSP3 can be adjusted independent of other LSPs because the adjustment of LSP5 is finished and timeslot 3 of the link of B-C becomes idle.

Block 608: Determine whether all adjustment items have been adjusted. If no, return to Block 604.

In this embodiment, the determination result in Block 608 is no, and Block 604 is therefore performed again. In Block 604, it is determined whether there is an adjustment item of the pending adjustment service independent of other services in the adjustment item table. As can be seen from the adjusted adjustment item tables, LSP3 is independent of other services and can be adjusted independently, and Block 605 is performed again.

According to this embodiment, in Block 605, the adjustment items of LSP3 are selected from the adjustment item tables and the adjustment items of LSP3 on each link is obtained, i.e. LSP3 is adjusted from timeslots 5 and 6 to timeslots 3 and 4 on the link of B-C, and LSP3 is adjusted from timeslots 5 and 6 to timeslots 3 and 4 on the link of C-D.

According to this embodiment, Block 606 is also performed again, in which, a new path is established for LSP3 using timeslots 3 and 4 of the link of B-C and timeslots 3 and 4 of the link of C-D respectively. The new path is the bold dotted line shown in FIG. 8. The service of LSP3 is switched to the new path by a soft rerouting manner in which a strict timeslot explicit route with corresponding timeslot granularity is designated and the resources of the links that need not be adjusted are shared, and the original path is removed, and timeslots 5 and 6 of the links of B-C and C-D are thus released.

According to this embodiment, Block 607 is also performed again, in which all adjustment items of LSP3 are removed from the adjustment item tables. Because there is only the adjustment item of LSP3 in each of the adjustment item tables of the links B-C and C-D, and the adjustment item tables of the links of B-C and C-D are null after the adjustment items of LSP3 are removed, and the adjustment item tables of the links of B-C and C-D are thus deleted at the same time.

Figure 9:
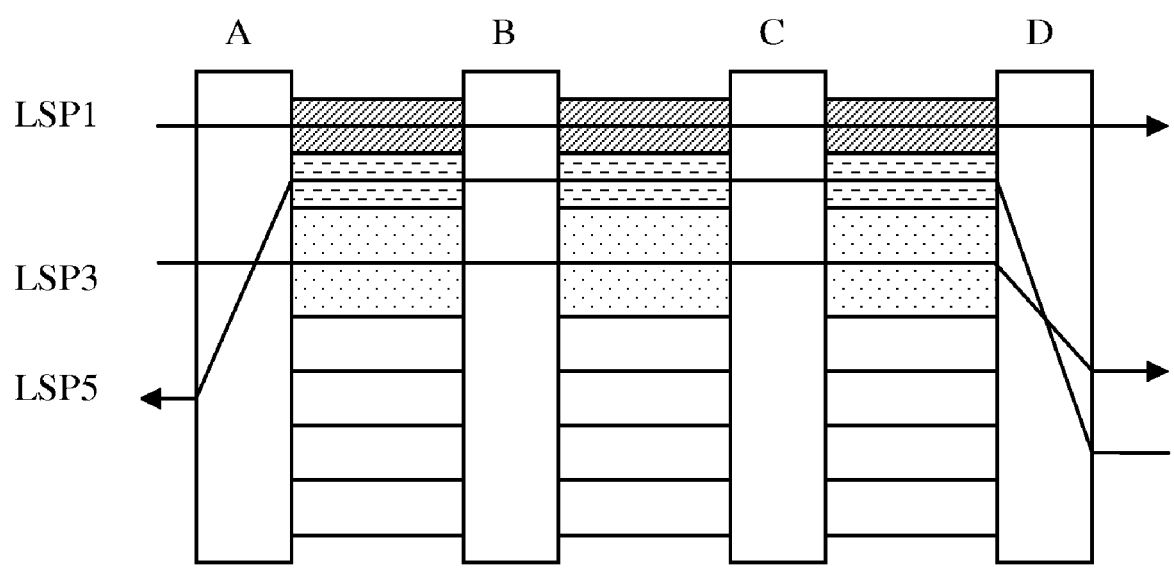
FIG. 9 is a schematic diagram illustrating a structure of the adjusted multiple links carrying LSP services in accordance with an embodiment of the present invention.

Accordingly, Block 608 is also performed again, in which it is determined whether all adjustment items have been adjusted. If yes, the adjustment task is finished. In this embodiment, the determination result is yes, and the adjustment task is thus finished and the timeslot allocation obtained is shown in FIG. 9.

In Block 602 above, the algorithm for calculation may be the Mobipack algorithm. In Block 605 above, if there are multiple services independent of other services to be selected, adjustment items of any one of the multiple services can be randomly selected to be adjusted.

Figure 10:
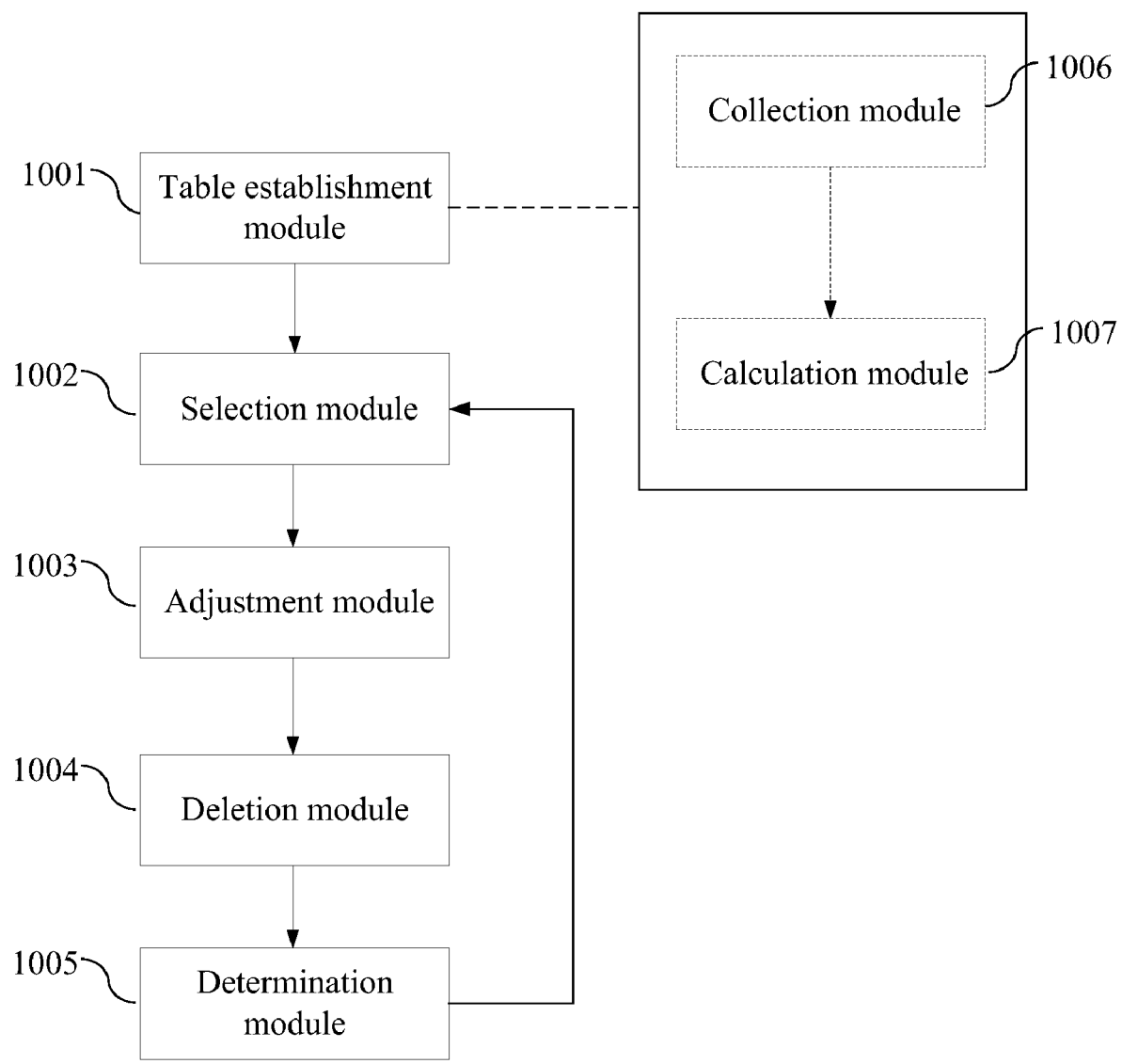
FIG. 10 is a schematic diagram illustrating a structure of an apparatus for adjusting timeslot fragments of multiple links in accordance with an embodiment of the present invention.

As shown in FIG. 10, an apparatus for adjusting timeslot fragments of multiple links in accordance with an embodiment of the present invention includes table establishment module 1001, selection module 1002, adjustment module 1003, deletion module 1004 and determination module 1005.

The table establishment module 1001 is operable for establishing an adjustment item table according to a timeslot allocation of links and an adjusted timeslot allocation.

The selection module 1002 is operable for selecting, from the adjustment item table established by the table establishment module 1001, an adjustment item of a pending adjustment service of which the timeslot adjustment that is independent of the timeslot adjustment of other services.

The adjustment module 1003 is operable for adjusting the timeslot allocation of links of the service selected by the selection module 1002 according to the adjustment item table established by the table establishment module 1001.

The deletion module 1004 is operable for deleting the adjustment item of the pending adjustment service from the adjustment item table after the adjustment module 1003 adjusts the timeslot allocation of all links of one pending adjustment service, and deleting the adjustment item table after all pending adjustment services of the adjustment item table are adjusted.

The determination module 1005 is operable for determining whether all adjustment items have been adjusted, determining whether there is an adjustment item of the pending adjustment service independent of other services in the adjustment item table, and sending a determination result to the selection module 1002.

Preferably, the table establishment module 1001 may include a collection module 1006 and a calculation module 1007 as shown in the dotted line in FIG. 10. The collection module 1006 is operable for collecting all the links necessary for timeslot fragment adjustment within the management domain of the same Automatically Switched Optical Network (ASON); the calculation module 1007 is operable for calculating the adjusted timeslot allocation according to the links necessary for timeslot fragment adjustment collected by the collection module 1006.

The foregoing presents only a number of preferred embodiments of the present invention. The scope of the present invention, however, is not limited to just these embodiments. Any change or substitution to these embodiments, within the technical scope disclosed by the present invention or comprising a foreseeable equivalent thereof, is included within the scope of the present invention. Moreover, the scope of the present invention is not in anyway limited beyond that which is slated in the claims.

What is claimed is:

1. A method for adjusting timeslot fragments of multiple links in an optical network by an adjustment apparatus, the method comprising:

obtaining, by a table establishment module of the adjustment apparatus, link information of multiple links necessary for timeslot fragment adjustment;

calculating, by the table establishment module, adjusted link information of each link necessary for the timeslot fragment adjustment according to the link information; and adjusting a timeslot allocation of said each link according to the adjusted link information;

wherein the step of adjusting a timeslot allocation of said each link according to the adjusted link information further includes the steps of:

establishing, by an adjustment module of the adjustment apparatus, a new path for a pending adjustment service according to the adjusted link information, wherein the new path includes multiple links necessary for timeslot fragment adjustment, wherein the new path passes through multiple nodes, each two adjacent links of the multiple links being connected by one node of the multiple nodes respectively, the node that connects two adjacent links being different for each two adjacent links;

switching, by the adjustment module, the pending adjustment service from an original path to the new path; and removing, by the adjustment module, the original path of the pending adjustment service.

2. A method for adjusting timeslot fragments of multiple links in an optical network by an adjustment apparatus, the method comprising:

obtaining, by a table establishment module of the adjustment apparatus, link information of multiple links necessary for timeslot fragment adjustment;

calculating, by the table establishment module, adjusted link information of each link necessary for the timeslot fragment adjustment according to the link information; and adjusting a timeslot allocation of said each link according to the adjusted link information;

wherein the step of obtaining link information of multiple links necessary for timeslot fragment adjustment further comprises collecting timeslot allocation information necessary for the timeslot fragment adjustment step in a management domain of an Automatically Switched Optical Network (ASON) including the multiple links;

wherein the step of calculating adjusted link information of each link according to the link information further comprises the steps of:

calculating adjusted timeslot allocation information after the timeslot fragment adjustment step according to the timeslot allocation information; and establishing an adjustment item table according to the timeslot allocation information before the timeslot fragment adjustment step and the adjusted timeslot allocation information after the timeslot fragment adjustment step; and wherein the step of adjusting a timeslot allocation of said each link according to the adjusted link information further includes the steps of:

establishing, by an adjustment module of the adjustment apparatus, a new path for a pending adjustment service according to the adjusted link information, wherein the new path includes at least one of the multiple links necessary for timeslot fragment adjustment;

switching, by the adjustment module, the pending adjustment service from an original path to the new path; and removing, by the adjustment module, the original path of the pending adjustment service.

3. The method of claim 1, wherein the step of obtaining link information of multiple links necessary for timeslot fragment adjustment further comprises the steps of:

collecting timeslot allocation information necessary for the timeslot fragment adjustment step in a management domain of an Automatically Switched Optical Network (ASON) including the multiple links; and the step of calculating adjusted link information of each link according to the link information further comprises the steps of:

calculating adjusted timeslot allocation information after the timeslot fragment adjustment step according to the timeslot allocation information; and establishing an adjustment item table according to the timeslot allocation information before the timeslot fragment adjustment step and the adjusted timeslot allocation information after the timeslot fragment adjustment step.

4. The method of claim 2, wherein the adjustment item table comprises:
an identity, ID, of a service connection path;
a timeslot number assigned before the timeslot fragment adjustment step;
a timeslot number assigned after the timeslot fragment adjustment step;
a bandwidth value; and
a dependent relation value relating to the timeslot fragment adjustment of other services.

5. The method of claim 3, wherein the adjustment item table comprises:
an identity, ID, of a service connection path;
a timeslot number assigned before the timeslot fragment adjustment step, a timeslot number assigned after the timeslot fragment adjustment step;
a bandwidth value; and
a dependent relation value relating to the timeslot fragment adjustment of other services.

6. The method of claim 2, further comprising the steps of:
deleting an adjustment item of the pending adjustment service from the adjustment item table; and
deleting the adjustment item table if adjustment items of all pending adjustment services in the adjustment item table are deleted.

7. The method of claim 3, further comprising the steps of:
deleting an adjustment item of the pending adjustment service from the adjustment item table; and
deleting the adjustment item table if adjustment items of all pending adjustment services in the adjustment item table are deleted.

8. The method of claim 1, wherein the step of switching the pending adjustment service from the original path to the new path further comprises the steps of:
switching the pending adjustment service to the new path by a soft rerouting process in which a strict timeslot explicit route with corresponding timeslot granularity is designated and resources of links that need not be adjusted are shared.

9. The method of claim 2, wherein the step of switching the pending adjustment service from the original path to the new path further comprises the steps of:
switching the pending adjustment service to the new path by a soft rerouting process in which a strict timeslot explicit route with corresponding timeslot granularity is designated and resources of links that need not be adjusted are shared.

10. An apparatus for adjusting timeslot fragments of multiple links, comprising:
a table establishment module, operable for obtaining link information of multiple links necessary for timeslot fragment adjustment, and for calculating adjusted link information of each link necessary for adjusting the timeslot fragments according to the link information; and
an adjustment module, operable for establishing a new path for a pending adjustment service according to the adjusted link information, wherein the new path includes multiple links necessary for timeslot fragment adjustment, wherein the new path passes through multiple nodes, each two adjacent links of the multiple links being connected by one node of the multiple nodes respectively, the node that connects two adjacent links being different for each two adjacent links; the adjustment module further operable for switching the pending adjustment service from an original path to the new path and removing the original path of the pending adjustment service.

11. The apparatus of claim 10, wherein the table establishment module comprises:
a collection module, operable for collecting timeslot allocation information necessary for adjusting the timeslot fragments in a management domain of an Automatically Switched Optical Network (ASON) including the multiple links, and for storing the timeslot allocation information in an adjustment item table; and
a calculation module, operable for calculating adjusted timeslot allocation information according to the timeslot allocation information collected by the collection module, and for storing the adjusted timeslot allocation information in the adjustment item table.

12. The apparatus of claim 11, further comprising:
a selection module, operable for selecting an adjustment item of a pending adjustment service from the adjustment item table.

13. The apparatus of claim 11, further comprising:
a deletion module, operable for deleting the adjustment item of the pending adjustment service from the adjustment item table after the adjustment module adjusts the timeslot allocation of each link of the pending adjustment service, and deleting the adjustment item table after all pending adjustment services of the adjustment item table have been adjusted by the adjustment module.

14. The apparatus of claim 12, further comprising:
a deletion module, operable for deleting the adjustment item of the pending adjustment service from the adjustment item table after the adjustment module adjusts the timeslot allocation of each link of the pending adjustment service, and deleting the adjustment item table after all pending adjustment services of the adjustment item table have been adjusted by the adjusted module.

15. The apparatus of claim 12, further comprising:
a determination module, operable for determining whether all pending adjustment services have been adjusted, and sending a determination result to the selection module upon determining whether all pending adjustment services have been adjusted.

* * * * *